United States Patent
Yoo et al.

(10) Patent No.: US 7,027,120 B2
(45) Date of Patent: Apr. 11, 2006

(54) LIQUID CRYSTAL DISPLAY DEVICE AND METHOD OF FABRICATING THE SAME

(75) Inventors: Soon-Sung Yoo, Kyoungsangbuk-do (KR); Dong-Yeung Kwak, Taegu (KR); Hu-Sung Kim, Seoul (KR); Yu-Ho Jung, Kyoungsangbuk-do (KR); Yong-Wan Kim, Kyoungsangbuk-do (KR); Duk-Jin Park, Taegu (KR); Woo-Chae Lee, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 134 days.

(21) Appl. No.: 10/753,449

(22) Filed: Jan. 9, 2004

(65) Prior Publication Data

US 2004/0145686 A1 Jul. 29, 2004

Related U.S. Application Data

(62) Division of application No. 09/919,614, filed on Aug. 1, 2001, now Pat. No. 6,798,477.

(30) Foreign Application Priority Data

Aug. 2, 2000 (KR) ........................................ 2000-44916

(51) Int. Cl.
*G02F 1/1333* (2006.01)

(52) U.S. Cl. ........................................ 349/141; 257/59
(58) Field of Classification Search ................ 349/141, 349/42, 129, 38, 43, 142; 257/59
See application file for complete search history.

(56) References Cited

U.S. PATENT DOCUMENTS

| | | | | |
|---|---|---|---|---|
| 5,600,461 A | * | 2/1997 | Ueda et al. | 349/38 |
| 6,243,146 B1 | * | 6/2001 | Rho et al. | 349/42 |
| 6,259,500 B1 | | 7/2001 | Kijima et al. | |
| 6,335,776 B1 | * | 1/2002 | Kim et al. | 349/129 |
| 6,380,559 B1 | * | 4/2002 | Park et al. | 257/59 |
| 6,587,162 B1 | * | 7/2003 | Kaneko et al. | 349/43 |
| 6,812,985 B1 | * | 11/2004 | Oh et al. | 349/141 |
| 2002/0021403 A1 | | 2/2002 | Kim et al. | |

* cited by examiner

*Primary Examiner*—Michael Lebentritt
*Assistant Examiner*—Andre' C. Stevenson
(74) *Attorney, Agent, or Firm*—McKenna Long & Aldridge LLP

(57) ABSTRACT

A liquid crystal display device and a method of fabricating the same are disclosed in the present invention. More specifically, the method includes the steps forming a gate line on the first substrate sequentially forming a first insulating layer, an amorphous silicon layer, and a metal layer on the first substrate, patterning the metal layer to form a data line, forming a second insulating layer on the data line, patterning the second insulating layer and the amorphous silicon layer to form a passivation layer and an active layer, respectively, forming a pixel electrode at a pixel region defined by the gate and data lines, assembling the first substrate and the second substrate having a black matrix thereon, wherein the black matrix vertically overlaps at least one boundary line defined by different exposures during step-and-repeat exposure processes; and forming a liquid crystal layer between the first and second substrates.

5 Claims, 13 Drawing Sheets

LIQUID CRYSTAL DISPLAY DEVICE AND METHOD OF FABRICATING THE SAME

This is a divisional of application Ser. No. 09/919,614, filed on Aug. 1, 2001 now U.S. Pat. No. 6,798,477.

This application claims the benefit of Korean patent application No. 2000-44916, filed Aug. 2, 2000 in Korea, which is hereby incorporated by reference.

BACKGROUND OF THE INVENTION

1. Field of the Invention

The present invention relates to a liquid crystal display device, and more particularly to a liquid crystal display device and a method of fabricating the same. Although the present invention is suitable for a wide scope of applications, it is particularly suitable for improving a four-mask process, thereby resolving a problem of stitch lines.

2. Discussion of the Related Art

Generally, a liquid crystal display (LCD) device includes an upper substrate, a lower substrate, and an interposed liquid crystal therebetween. The upper and lower substrates respectively have electrodes opposing to each other. When an electric field is applied between the electrodes of the upper and lower substrates, molecules of the liquid crystal are aligned according to the electric field. By controlling the electric field, the liquid crystal display device provides various transmittances for rays of light to display images.

By now, an active matrix LCD (AM LCD) device is the most popular because of its high resolution and superiority in displaying moving video data. A typical AM LCD device has a plurality of switching elements and pixel electrodes, which are arranged in an array matrix on the lower substrate. Therefore, the lower substrate of the AM LCD device is alternatively referred as an array substrate.

On the upper substrate of the AM LCD device, a common electrode made of a transparent conductive material is usually formed. In case of a color LCD device, a color filter is further formed between the upper substrate and the common electrode of the upper substrate.

The above-mentioned lower substrate and the upper substrate are attached together with each other using a sealant therebetween. A liquid crystal is then interposed into a cell gap formed between the upper and lower substrates.

Because the pixel and common electrodes, as mentioned above, are respectively positioned on the lower and upper substrates, the electric field induced therebetween is perpendicular to the lower and upper substrates. The above-mentioned liquid crystal display device has high transmittance and aperture ratio. In addition, since the common electrode on the upper substrate serves as a ground, static electricity destroying the liquid crystal display device is eliminated.

At this point, there exist various intervals around the pixel electrode or other elements. If rays of light pass through the intervals, abnormal images may be displayed. To avoid a leakage of light, the upper substrate further includes a black matrix. The black matrix shields the intervals, thereby preventing rays of light from passing through the intervals.

Five or six masks were conventionally used in a masking step for fabricating the array substrate for an LCD device. Since the masking step includes a plurality of sub-steps including cleaning, depositing, baking, etching, and the like, if one masking step can be reduced, fabrication time and cost greatly decrease. Therefore, a research for decreasing the total number of masks has been actively performed such that four masks are now using in fabricating the LCD device.

Referring to FIGS. 1 and 2, an array substrate is fabricated by applying a conventional four-mask processing. FIG. 1 is a plane view illustrating the array substrate while FIG. 2 is a cross-sectional view taken along the line II—II of FIG. 1.

As shown, a gate line 21 is disposed on the array substrate 10, and a gate electrode 22 protrudes from the gate line 21 in the direction perpendicular to the gate line 21. A gate insulating layer 30 is disposed to cover the gate line 21 including the gate electrode 22. An undoped amorphous silicon layer 41 and a doped amorphous silicon layer 52 are sequentially are disposed on the gate insulating layer 30. The undoped amorphous silicon layer 41 disposed over the gate line 22 serves as an active layer (hereinafter, the reference numeral 41) while the doped amorphous silicon layer 52 disposed on the active layer 41 serves as an ohmic contact layer (hereinafter, the reference numeral 52).

On the ohmic contact layer 52, a data line 61 perpendicularly crossing the gateline 21, a source electrode 62 and a drain electrode 63 are disposed thereon. The source electrode 62 protrudes from the data line 61 while the drain electrode 63 is spaced apart from the source electrode 62 with the gate electrode 22 centering on therebetween.

The gate electrode 22, the source electrode 62, the drain electrode 63, and the active layer 41 collectively define a thin film transistor "T", which serves as a switching element of the LCD device. Further, a passivation layer 71 is formed to cover all of the data line 61, the source electrode 62, and the drain electrode 63. The passivation layer 71 has the same shape as the active layer 41 in the plane view of FIG. 1. In a pixel region "P" defined by the crossing gate and data lines 21 and 61, a pixel electrode 81 formed of a transparent conductive material is disposed thereon.

As previously mentioned, a black matrix formed on a color filter substrate is used for preventing rays of light from leaking through various intervals around the pixel electrode 81. FIG. 3 shows the black matrix 90, which covers the above-mentioned electrical lines and electrodes except for the pixel electrode 81.

With reference to FIGS. 4A to 4C and FIG. 2, conventional process steps for fabricating the above-mentioned array substrate is explained hereinafter. These process steps have been suggested in U.S. patent application Ser. No. 09/885,527.

In FIG. 4A, a first metal layer is deposited on the array substrate 10 and patterned using a first mask to form the gate electrode 22 and the gate line (not shown).

In FIG. 4B, the gate insulating layer 30, an amorphous silicon layer 40, a doped amorphous silicon layer, and a second metal layer are sequentially deposited on the array substrate 10. The second metal layer and the doped amorphous silicon layer are subsequently patterned using a second mask such that the data line 61, the source electrode 62, the drain electrode 63, and the ohmic contact layer 52 are formed. A portion 52a (shown in FIG. 6A) of the doped amorphous silicon layer below the data line 61 is protected from etching processes, thereby remaining even after the etching processes. Sputtering is preferably used for depositing the second metal layer, and photolithography is preferably used for patterning in the above processes.

In FIG. 4C, silicon nitride or silicon oxide is deposited on the array substrate 10 and then patterned together with the amorphous silicon layer (shown in the reference numeral 40 of FIG. 4B) using a third mask. As a result, the passivation layer 71 and the active layer 41 are formed thereon. The passivation layer 71 covers the data line 61, the source electrode 62, and the drain electrode 63. The side edge of the drain electrode 63 is however exposed out of the passivation layer 71.

As shown in FIG. 2, a transparent conductive material is deposited on the array substrate 10 and patterned using a fourth mask such that the pixel electrode 81 is formed thereon. The pixel electrode 81 contacts the exposed side edge of the drain electrode 63. Further, the pixel electrode 81 overlaps a portion of the previous gate line 21a that precedes the gate line 21 defining the pixel region "P".

As explained above, because only four masks are used in fabricating the array substrate, a fabrication cost can be reduced.

An exposure apparatus is used for photolithography of the above-explained method. The exposure apparatus can expose only a specific area at one time. Therefore, if a substrate to be exposed is much larger than the specific area of the exposure apparatus, a step-and-repeat exposure process is applied. In the step-and-repeat exposure process, portions of the substrate are sequentially exposed to light until the overall surface of the substrate is exposed to light.

FIG. 5 and FIGS. 6A to 6C show the steps of forming the passivation layer 71 by applying the step-and repeat exposure process.

In FIG. 6A, after an insulating layer 70 is formed to cover the second metal layer including the data line 61, a photoresist 100 is deposited on the insulating layer 70. The photoresist 100 is repeatedly exposed to light by applying the step-and-repeat exposure process. During the step-and-repeat exposure, first to fourth regions "A" to "D" of the substrate shown in FIG. 5 are sequentially exposed to light.

After the exposure is completed, the photoresist 100 is developed and etched such that it is patterned to have first to third photoresist portions 100a, 100b, and 100c, as shown in FIG. 6B. The first photoresist portion 100a is thicker than the second photoresist portion 100b. The third photoresist portion 100c is shown as an open hole exposing a portion of the insulating layer 70.

Various thickness of the patterned photoresist 100 can be achieved by controlling an exposing time with respect to desired portions. The first photoresist portion 100a covers the second metal layer including the data line 61 and is shielded from rays of light during the exposure. The third photoresist portion 100c covers regions around the broken lines of FIG. 5 and is exposed twice to light. The second photoresist portion 100b covers the other regions except for the second metal layer and the boundary lines, and is exposed to light for just one time.

After the developing and etching processes, the first photoresist portion 100a has no change in its thickness, whereas the third photoresist portion 100c is totally removed to be an open hole. Further, the second photoresist portion 100b has a smaller thickness than the first photoresist portion 100a.

After the photoresist 100 is patterned, the first and second photoresist patterns 100a and 100b are etched together with various layers including the insulating layer 70 and the amorphous silicon layer 40. A dry etching is usually selected for the above-mentioned etching process. After the dry etching is finished, the first photoresist portion 100a having the largest thickness still remains and has a decreased thickness. Therefore, portions of the insulating layer 70 below the first photoresist portion 100a are protected from the etching.

However, portions of the insulating layer 70, the amorphous silicon layer 40, and the gate insulating layer 30 that correspond to the third portion 100c are removed in the process. Specifically, the removed portion of the gate insulating layer 30 is referred to as a stitch line "S" (shown in FIG. 6C). In addition, portions of the insulating layer 70 and the amorphous silicon layer 40 below the second photoresist portion 100b are removed during the etching process. After the above-mentioned etching is completed, a residual portion of the photoresist 100 is further removed via an additional processing such as ashing or cleaning.

In FIG. 6C, the passivation layer 71 and the active layer 41 are formed. The passivation layer 71 and the active layer 41 are respectively the insulating layer 70 (shown in FIG. 6B) and the amorphous silicon layer 40 (shown in FIG. 6B) disposed below the first photoresist portion 100 (shown in FIG. 6B). The stitch lines "S" are conventionally formed at the pixel region "P" (shown in FIG. 5), thereby causing a problem in display quality of the conventional LCD device.

As explained above, when the step-and-repeat exposure process is used for forming the passivation layer 71, the stitch lines "S" are conventionally formed at the pixel region "P". Since the stitch line "S" is formed at the pixel region "P" (shown in FIG. 1) serving as a portion of the display area of the LCD device, a stain may be seen on the display area.

FIG. 7 illustrates another problem caused by the conventional step-and-repeat exposure process. In case of applying the step-and-repeat exposure process to pattern the photoresist, the shape of the previously exposed portion may not match that of a later exposed portion since portions of the photoresist are exposed at different times.

After the photoresist is patterned, it has a different shape from the desired one. Since the patterned photoresist is used for forming the passivation layer, the passivation layer cannot be formed to have a desired shape. For example, as shown in FIG. 7, a first portion 71a and a second portion 71b of the passivation layer 71 may not coincide with each other such that the passivation layer 71 is crooked. In such a case, the first portion 71a at the first region "A" and the second portion 71b at the second region "B" exhibit different distances measured from the pixel electrode 81. As a result, the above-mentioned distance variation between the pixel electrode 81 and the passivation layer 71 causes a capacitance variation between the pixel electrode 81 and the data line 61 with respect to different regions.

SUMMARY OF THE INVENTION

Accordingly, the present invention is directed to a liquid crystal display device and a method of fabricating the same that substantially obviates one or more of problems due to limitations and disadvantages of the related art.

Another object of the present invention is to provide an improved four mask processing that excludes a problem of the stitch lines in fabricating a liquid crystal display device.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device having first and second substrates includes the steps of forming a gate line on the first substrate, sequentially forming a first insulating layer, an amorphous silicon layer, and a metal layer on the first substrate, patterning the metal layer to form a data line, forming a second insulating layer on the data line, patterning the second insulating layer and the amorphous silicon layer to form a passivation layer and an active layer, respectively, forming a pixel electrode at a pixel region defined by the gate and data lines, assembling the first substrate and the second substrate having a black matrix thereon, wherein the black matrix vertically overlaps at least one boundary line defined by different exposures during step-and-repeat exposure processes, and forming a liquid crystal layer between the first and second substrates.

In another aspect of the present invention, a liquid crystal display device includes first and second substrates facing into each other, a gate line on an inner surface of the first substrate, a first insulating layer on the gate line, a silicon layer on the first insulating layer, a data line on the silicon layer, the data line crossing with the gate line, a second insulating layer on the data line, the second insulating layer having the same shape as the silicon layer, a pixel electrode at a pixel region defined by the gate and data lines, a black matrix on an inner surface of the second substrate, a common electrode on the black matrix, and a liquid crystal layer between the first and second substrates, wherein at least one stitch line is formed in the gate insulating layer during a step-and-repeat exposure for forming the second insulating layer, and the black matrix vertically overlap the stitch line.

In another aspect of the present invention, a method of fabricating a liquid crystal display device having first and second substrates includes the steps of forming a gate line on the first substrate, forming a gate insulating layer on the first substrate including the gate line, forming an amorphous silicon layer on the gate insulating layer, forming a data line on the amorphous silicon layer, forming an insulating layer on the amorphous silicon layer including the data line, forming a photoresist layer having first, second, and third portions on the insulating layer, wherein the first portion has a thickness greater than the second portion, and the third portion exposes a portion of the insulating layer, selectively removing the insulating layer and the amorphous layer to form a passivation layer on the data line and an active layer below the data line, forming a pixel electrode on the gate insulating layer, forming a black matrix over the second substrate, and assembling the first and second substrates to substantially overlap at least one boundary line and the black matrix in a vertical direction, wherein the boundary line is defined during step-and-repeat exposures at different times.

In a further aspect of the present invention, a liquid crystal display device includes first and second substrates facing into each other, a gate line on the first substrate, a gate insulating layer on the first substrate including the gate line, an active layer on the gate insulating layer, a data line over the active layer, a passivation layer on the data line, a pixel electrode on the gate insulating layer and having a stitch line therein, a black matrix over the second substrate, wherein the stitch line in the pixel electrode substantially overlaps the black matrix in a vertical direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A to 11A are plane views illustrating a fabrication processing for an array substrate of a liquid crystal display device according to a first embodiment of the present invention;

FIGS. 13A to 16A are plane views illustrating a fabrication processing for an array substrate of a liquid crystal display device according to a second embodiment of the present invention;

DETAILED DESCRIPTION OF THE PREFERRED EMBODIMENTS

Reference will now be made in detail to the preferred embodiments of the present invention, which are illustrated in the accompanying drawings. Whenever possible, the same reference numbers will be used throughout the drawings to refer to the same or like parts.

Figure 1:
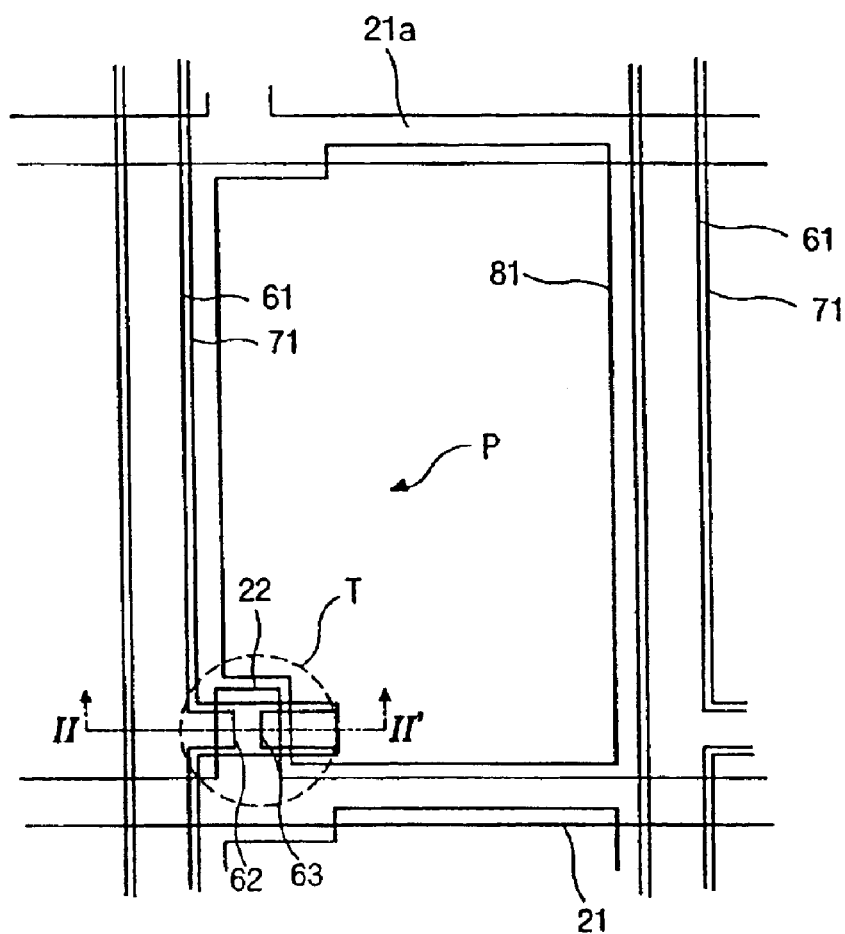
FIG. 1 is a plane view illustrating an array substrate according to the related art.
Figure 2:
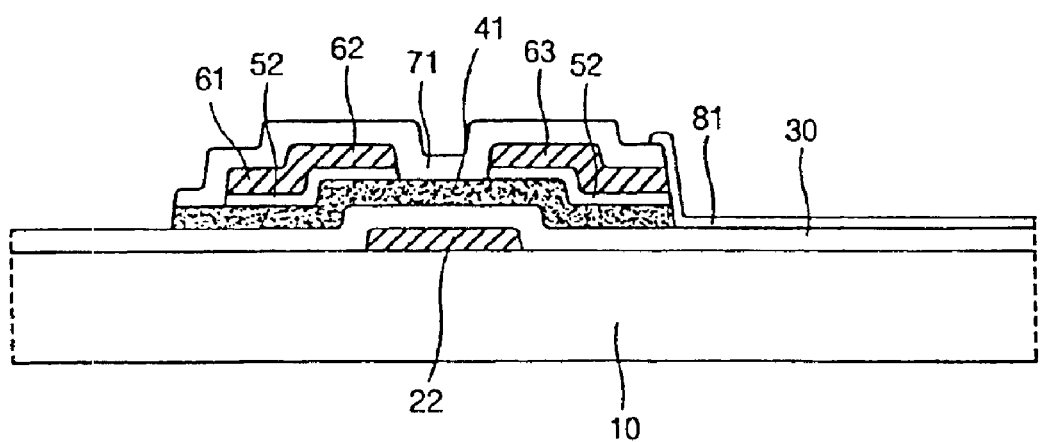
FIG. 2 is a cross-sectional view taken along the line "II—II" of FIG. 1.
Figure 3:
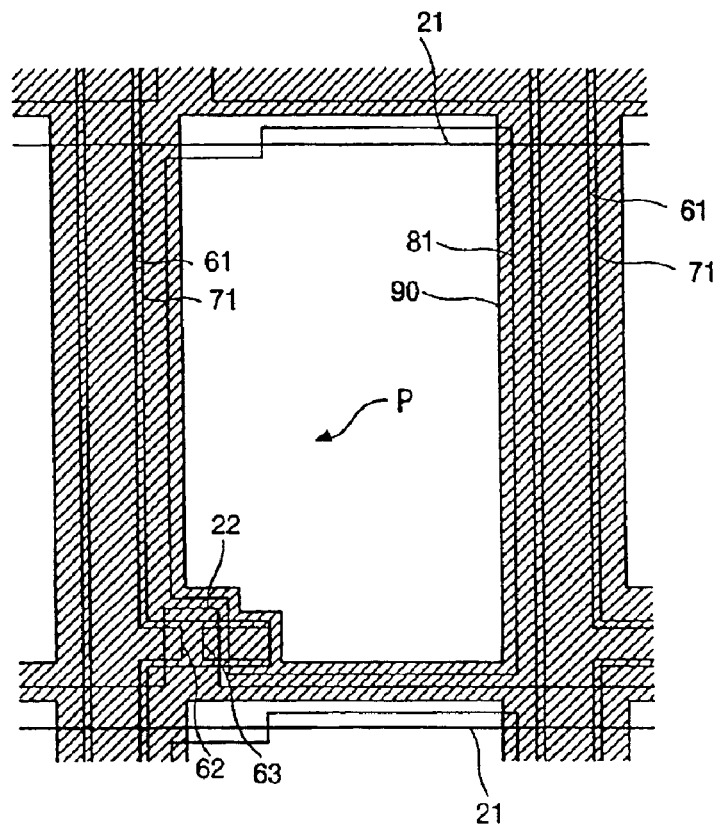
FIG. 3 is a plane view illustrating a black matrix disposed over the, array substrate of FIG. 1.
Figure 4A:
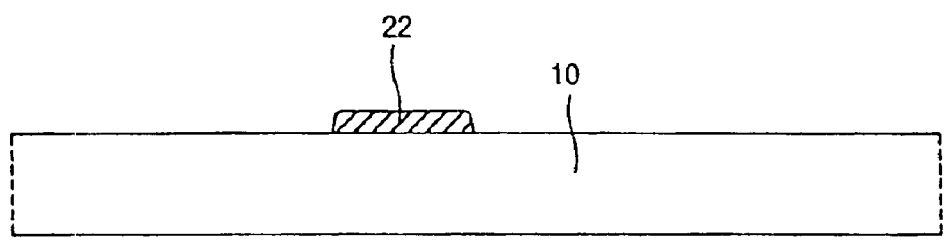
FIGS. 4A to 4C are cross-sectional views illustrating a sequence of fabricating the array substrate of FIG. 2.
Figure 4B:
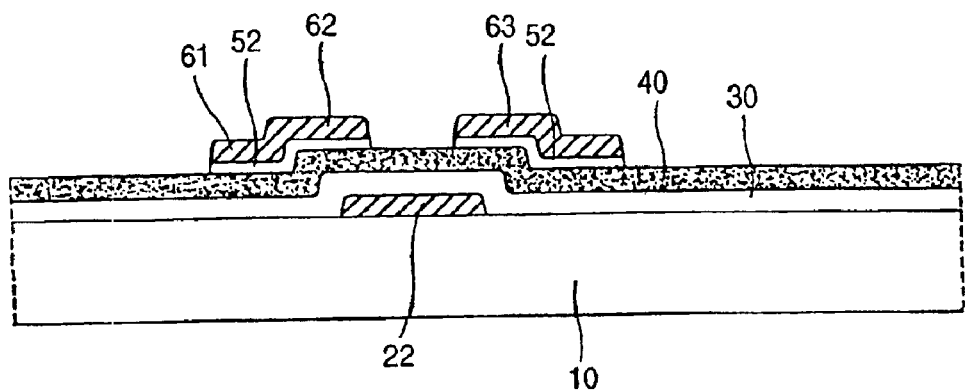
Figure 4C:
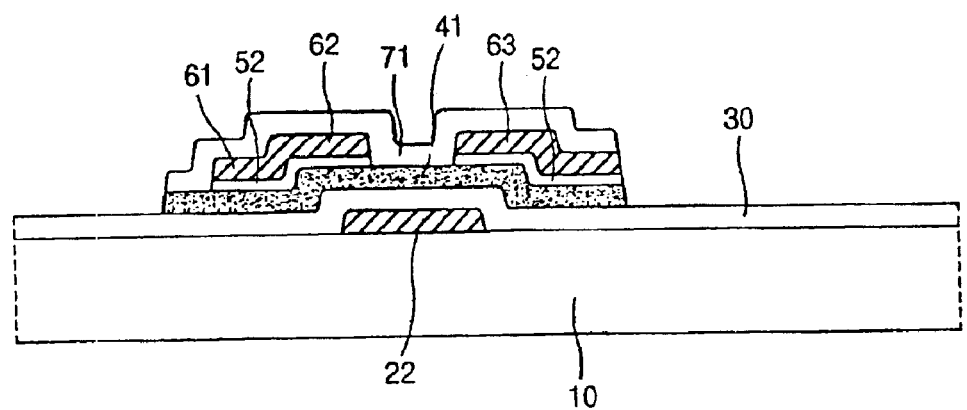
Figure 5:
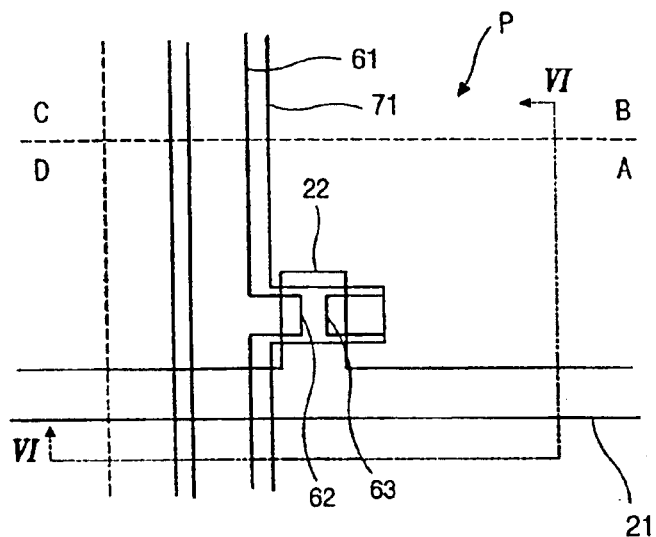
FIG. 5 is a plane view illustrating a step of fabricating a passivation layer according to the related art.
Figure 6A:
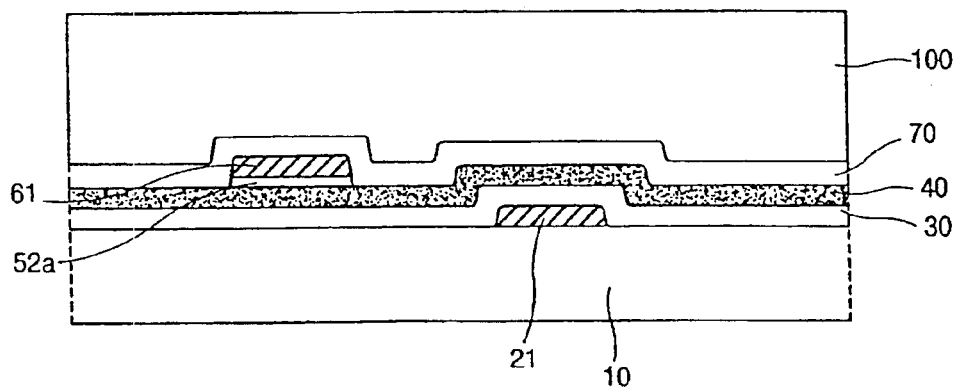
FIGS. 6A to 6C are cross-sectional views illustrating a sequence of forming the passivation layer taken along the line "VI—VI" of FIG. 5.
Figure 6B:
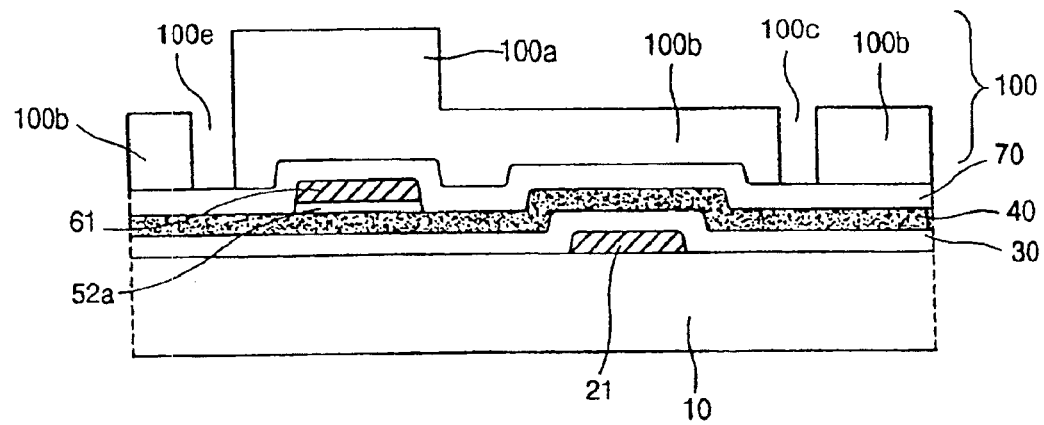
Figure 6C:
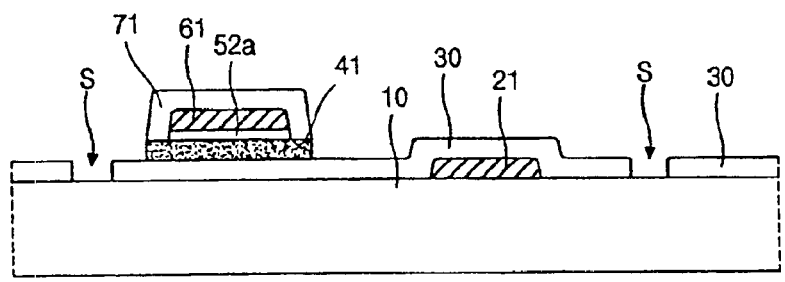
Figure 7:
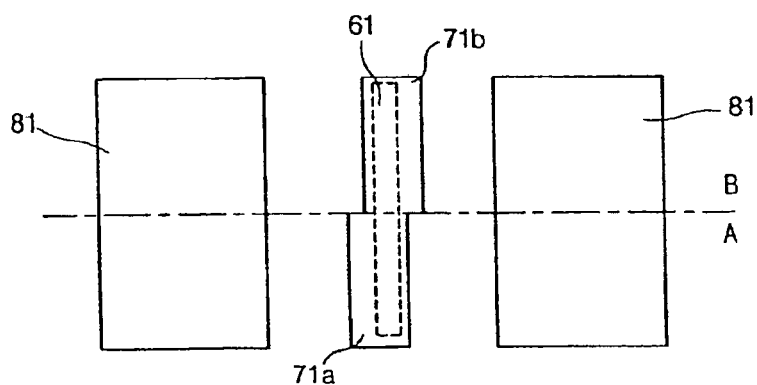
FIG. 7 is a plane view illustrating a passivation layer formed to have a defect due to the problem of the step-and-repeat exposure process.
Figure 8A:
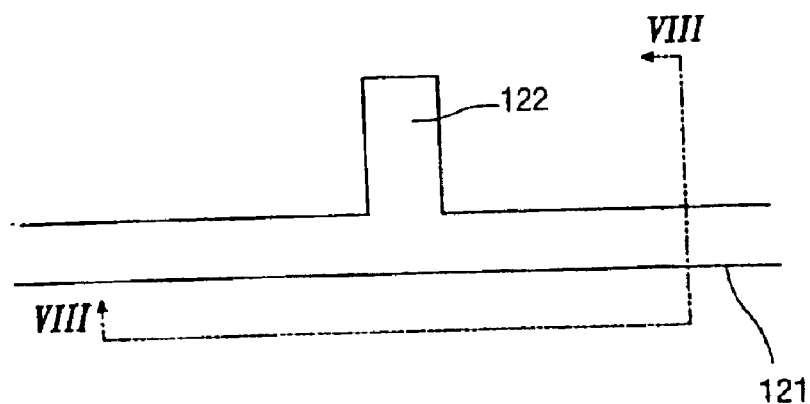
Figure 8B:
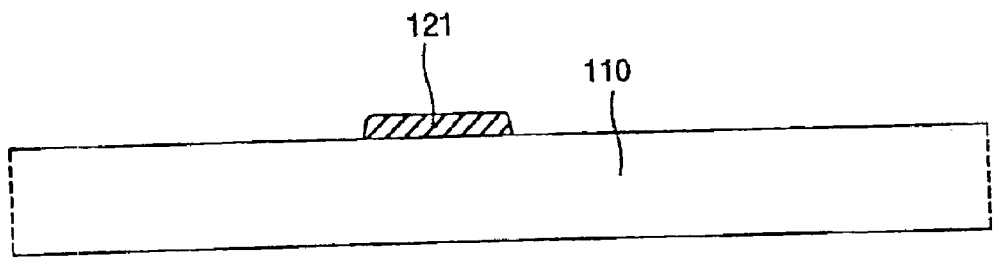
FIGS. 8B, 9B, and 11B are cross-sectional views taken along the lines "VIII—VIII", "IX—IX", and "XI—XI" of FIGS. 8A, 9A, and 11A, respectively.

In FIGS. 8A and 8B, a first metal layer is deposited and patterned to form a gate line 121 and a gate electrode 122 on an array substrate 110. The gate line 121 and the gate electrode 122 are arranged to be perpendicular to each other.

Figure 9A:
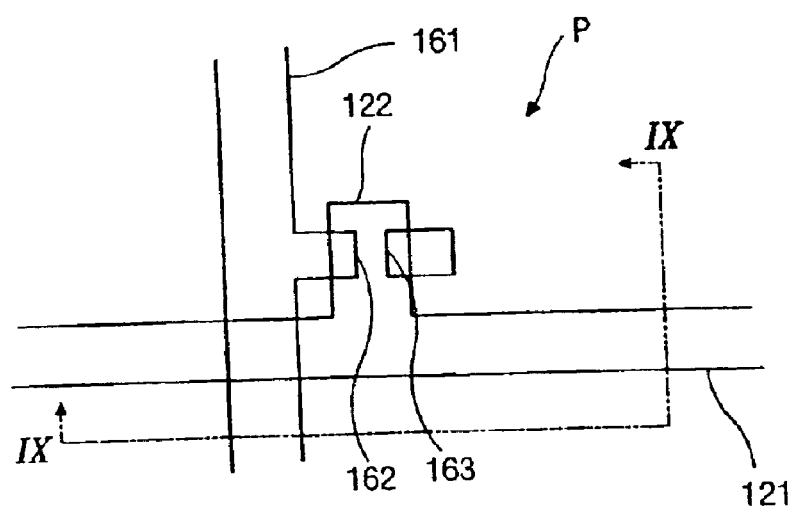
Figure 9B:
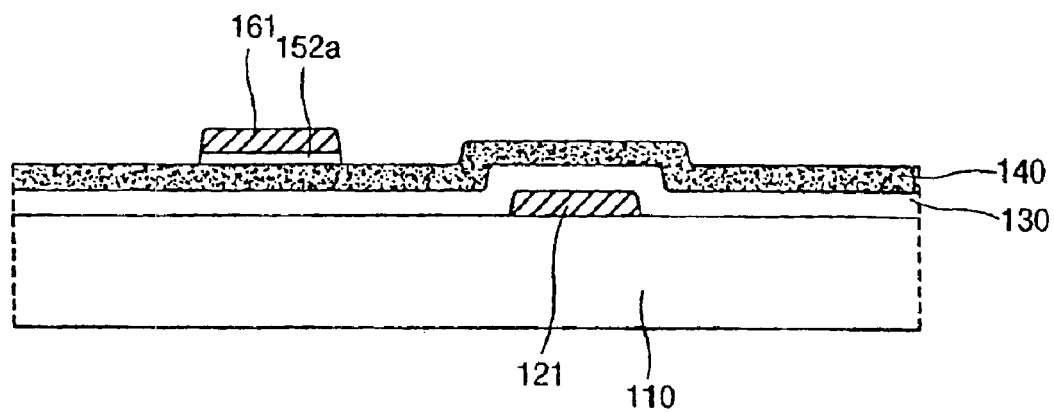

In FIGS. 9A and 9B, a gate insulating layer 130, an amorphous silicon layer 140, a doped amorphous silicon layer, and a second metal layer are sequentially deposited on the array substrate 110. Subsequently, the second metal layer and the doped amorphous silicon layer are simultaneously patterned to form a data line 161, a source electrode 162, a drain electrode 163, and an ohmic contact layer 152 (shown in FIG. 14B). A portion 152a of the doped amorphous silicon layer below the data line 161 is protected from etching, thereby remaining even after the etching.

Figure 10A:
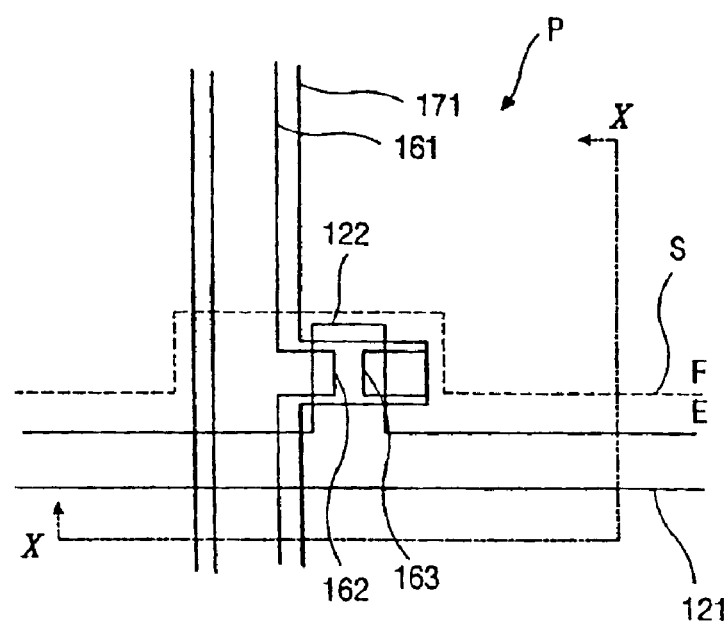
Figure 10B:
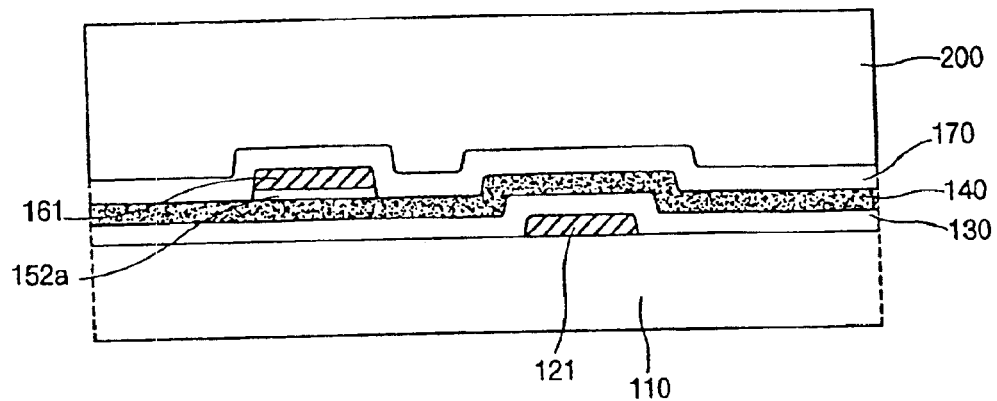
FIGS. 10B to 10D are cross-sectional views taken along the line "X—X" of FIG. 10A.
Figure 10C:
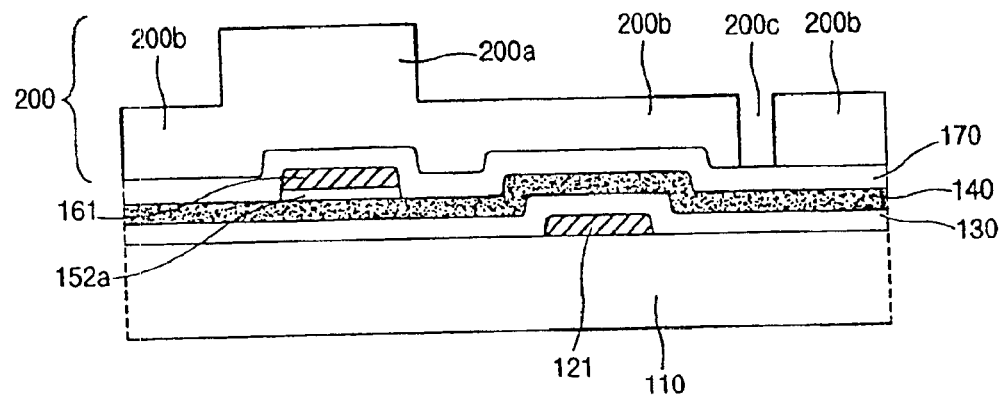
Figure 10D:
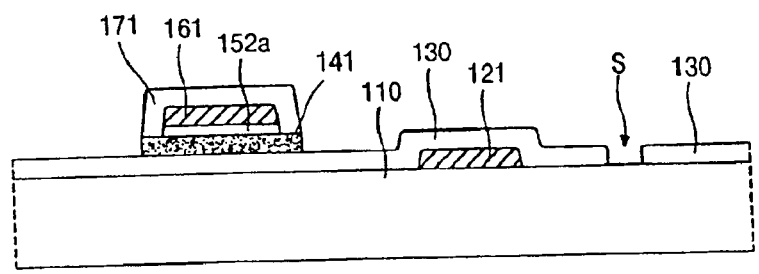

In FIGS. 10A to 10D, a passivation layer 171 is formed to cover the second metal layer including the data line 161. The amorphous silicon layer 140 is patterned to form an active layer 141. At this point, a step-and-repeat exposure process is applied for forming the passivation layer 171 and the active layer 141. For the step-and-repeat exposure, a first region "E" and a second region "F" (shown in FIG. 10A) of the array substrate 110 are sequentially exposed to light. Referring to FIGS. 10B to 10D, a more detailed explanation will be provided hereinafter.

As shown in FIG. 10B, silicon nitride ($SiN_x$) or silicon oxide ($SiO_2$) is deposited to form an insulating layer 170 covering the array substrate 110. A photoresist 200 is deposited thereon.

In FIG. 10C, the photoresist 200 is exposed to light using the step-and-repeat exposure process and is subsequently developed and etched such that a first photoresist portion 200a to a third photoresist portion 200c are formed thereon. At this point, a boundary line defining the first and second region "E" and "F" is preferably designed to be disposed below a black matrix 190 (shown in FIG. 12A), which is formed on a color filter substrate (not shown) facing into the array substrate 110.

The first photoresist portion 200a is thicker than the second photoresist portion 200b. The third photoresist portion 200c is an open hole exposing a portion of the insulating layer 170. Various thickness of the patterned photoresist 200 can be obtained by controlling the amount of exposing light with respect to the desired portions.

The first photoresist portion 200a covering the second metal layer including the data line 161 was shielded from rays of light during the exposure. The third photoresist portion 200c covering the regions around the boundary line in FIG. 10A was exposed twice to light, while the second photoresist portion 200b covering the other regions was exposed to light just once.

After the developing and etching, the first photoresist portion 200a has no change in its thickness, but the third photoresist portion 200c is completely removed to be an open hole. The second photoresist portion 200b has a smaller thickness than the first photoresist portion 200a.

After the photoresist 200 is patterned, the first and second photoresist portions 200a and 200b are further etched together with the various layers including the insulating layer 170 and the amorphous silicon layer 140. As a result, the passivation layer 171 and the active layer 141 are formed as shown in FIG. 10D. A dry etching is preferably selected for the above-mentioned etching.

After the dry etching is finished, the first photoresist portion 200a (shown in FIG. 10C) having the largest thickness still remains and has a decreased thickness. Therefore, portions of the insulating layer 170 (shown in FIG. 10C) below the first photoresist portion 200a (shown in FIG. 10C) are protected from the etching. Portions of the insulating layer 170 (shown in FIG. 10C), the amorphous silicon layer 140 (shown in FIG. 10C), and the gate insulating layer 130 that correspond to the third photoresist portion 200c (shown in FIG. 10C) are removed together with the photoresist 200.

Figure 11A:
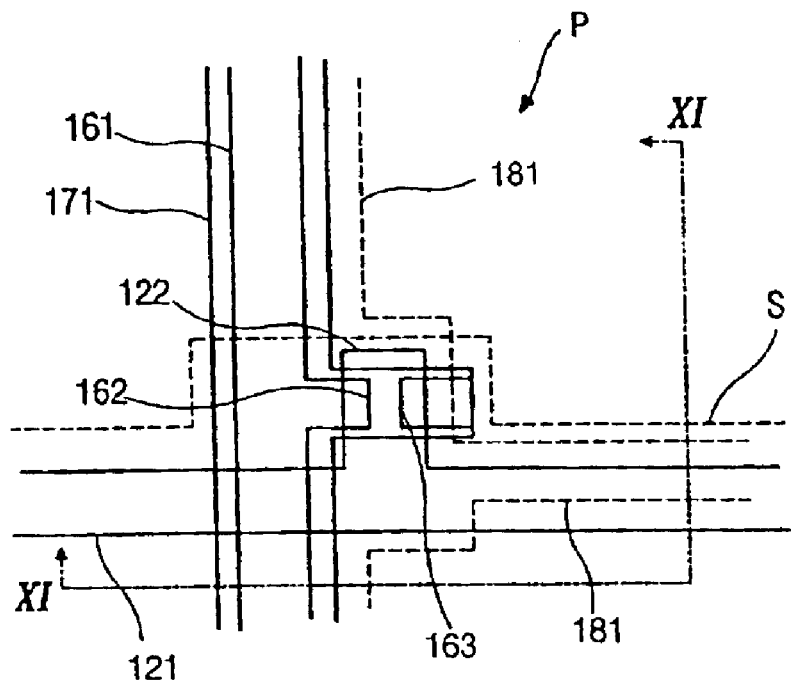

Specifically, the removed portion of the gate insulating layer 130 is referred to as a stitch line "S" (shown in FIGS. 10D and 11A). In addition, portions of the insulating layer 170 (shown in FIG. 10C) and the amorphous silicon layer 140 (shown in FIG. 10C) below the second photoresist portion 200b (shown in FIG. 10C) are removed during the dry etching.

After the above-mentioned dry etching is finished, a residual portion of the photoresist 200 is further removed via an additional processing such as ashing or cleaning. The passivation layer 171 and the active layer 141 respectively correspond to the portions of the insulating layer 170 (shown in FIG. 10C) and the amorphous silicon layer 140 (shown in FIG. 10C) disposed below the first photoresist portion 200a (shown in FIG. 10C).

As previously explained, the boundary line (the broken line in FIG. 10A) defines the first and second regions "E" and "F" (shown in FIG. 10A), and the stitch line "S" is formed along the boundary line during the dry etching. In the first embodiment, the boundary line is designed to be near the gate line 121 such that the black matrix 190 (shown in FIG. 12A) can shield the stitch line "S" formed along the boundary line. This is critical in the first embodiment.

Figure 11B:
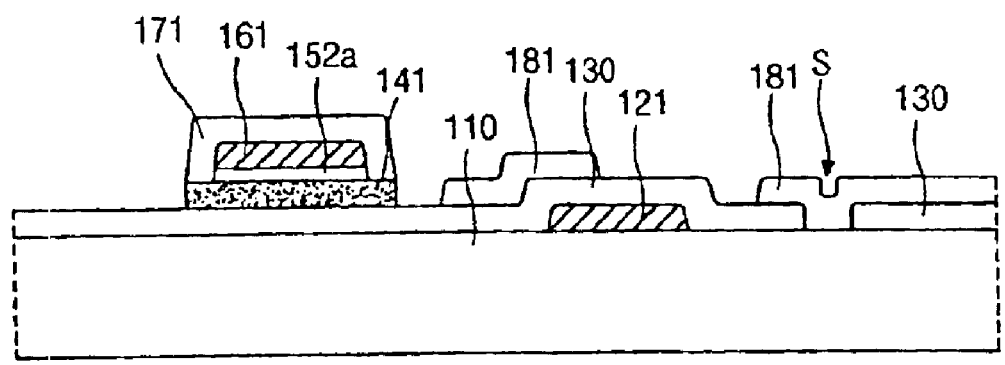

After the passivation layer 171 is formed, a pixel electrode 181 made of a transparent conductive material such as indium tin oxide (ITO) is formed on the array substrate 110, as shown in FIGS. 11A and 11B. The pixel electrode 181 electrically contacts the drain electrode 163.

Figure 12A:
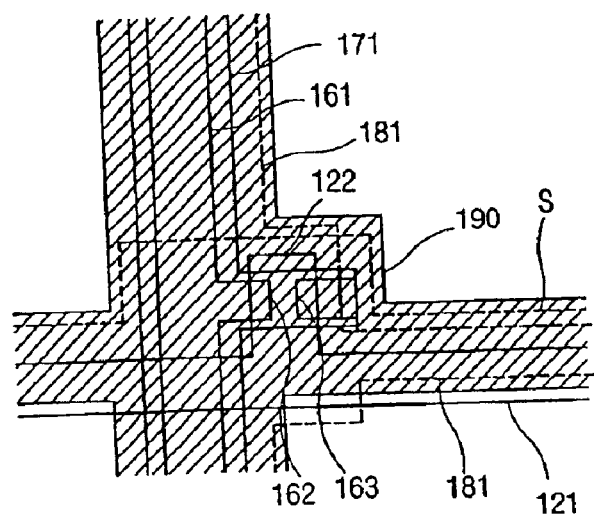
FIGS. 12A and 12B are a plan view and a cross-sectional view illustrating a black matrix disposing over the array substrate of FIG. 11B.
Figure 12B:
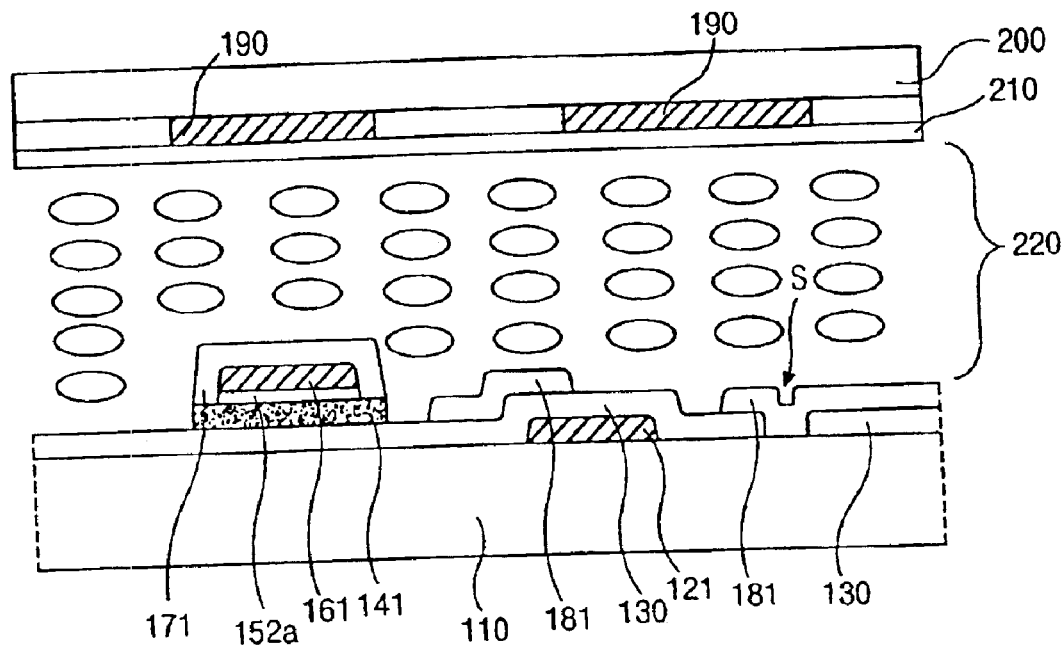

FIGS. 12A and 12B show the black matrix 190, which covers the above-mentioned electrical lines and electrodes except for the pixel electrode 181. A color filter substrate 200 faces into the array substrate 110, and a liquid crystal layer 220 is interposed therebetween. A black matrix is preferably formed on the color filter substrate 200 opposing to the array substrate 110. A common electrode 210 is preferably formed below the black matrix 190. At this point, the stitch line "S" is disposed below the black matrix 190 of the color filter substrate 200, thereby being covered by the black matrix 190. Accordingly, an abnormal stain due to the stitch line "S" does not occur on a display area of the liquid crystal display device according to the first embodiment.

Alternatively, according to a second embodiment, the boundary line defining the different exposure regions may be disposed over the gate line 121 and/or data line 161 such that the stitch line "S" are not formed at all. Referring now to FIGS. 13A to 16A and 13B to 16B, an array substrate according to the second embodiment will be explained hereinafter.

Figure 13A:
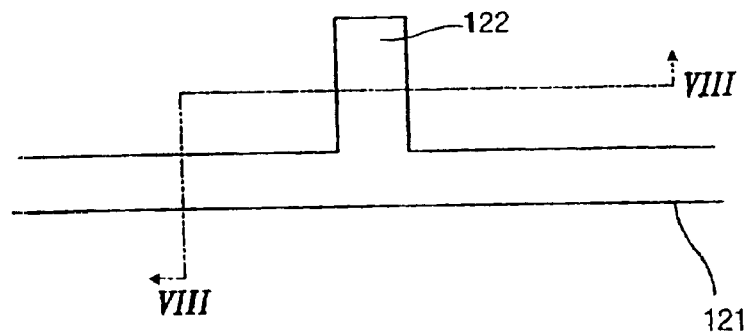
Figure 13B:
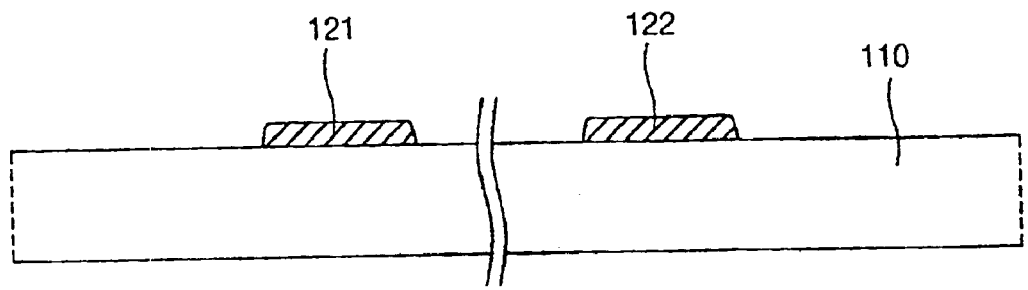
FIGS. 13B, 14B, and 16B are cross-sectional views taken along the lines "XIII—XIII", "XIV—XIV", and "XVI—XVI" of FIGS. 13A, 14A, and 16A, respectively.

In FIGS. 13A and 13B, a first metal layer is deposited and patterned to form a gate line 121 and a gate electrode 122 on an array substrate 110. The gate line 121 and the gate electrode 122 are arranged to be perpendicular to each other.

Figure 14A:
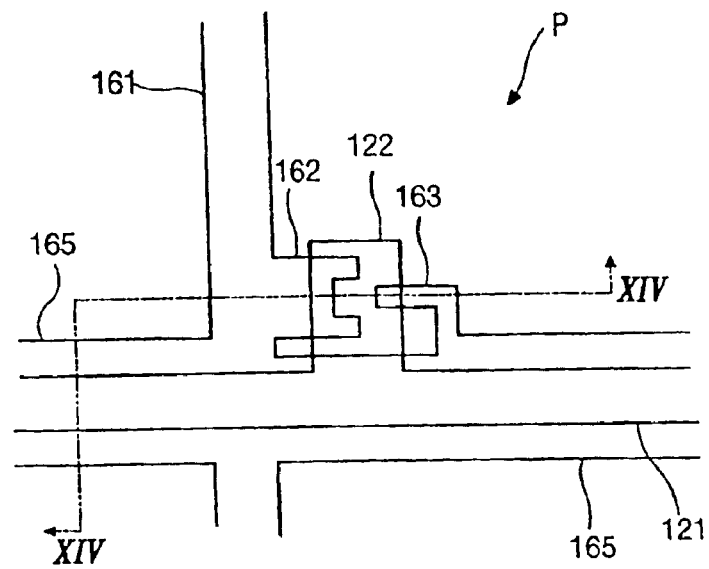
Figure 14B:
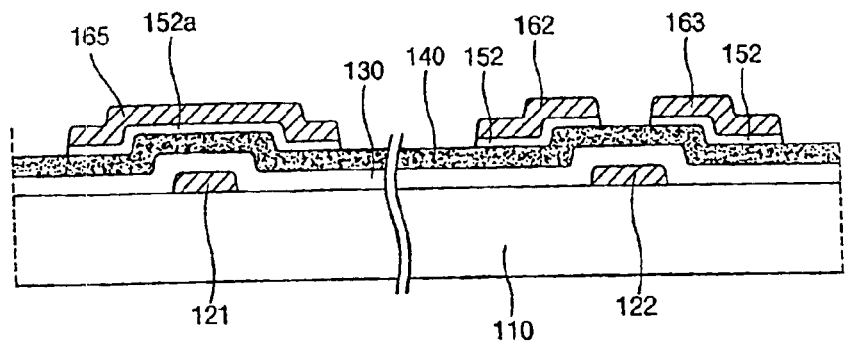

In FIGS. 14A and 14B, a gate insulating layer 130, an amorphous silicon layer 140, a doped amorphous silicon layer, and a second metal layer are sequentially deposited on the array substrate 110. Subsequently, the second metal layer and the doped amorphous silicon layer are simultaneously patterned to form the data line 161 including an auxiliary data line 165, a source electrode 162, a drain electrode 163, and an ohmic contact layer 152. A portion 152a of the doped amorphous silicon layer below the data line 161 and the auxiliary data line 165 is protected from etching, thereby remaining after the etching. The auxiliary data line 165 will be removed in a later processing but currently covers the gate line 121 to protect it from the later processing, which is explained with reference to FIGS. 15A to 15C.

Figure 15A:
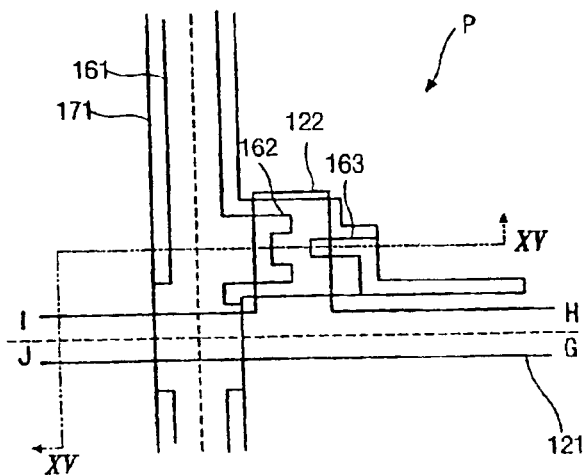
Figure 15B:
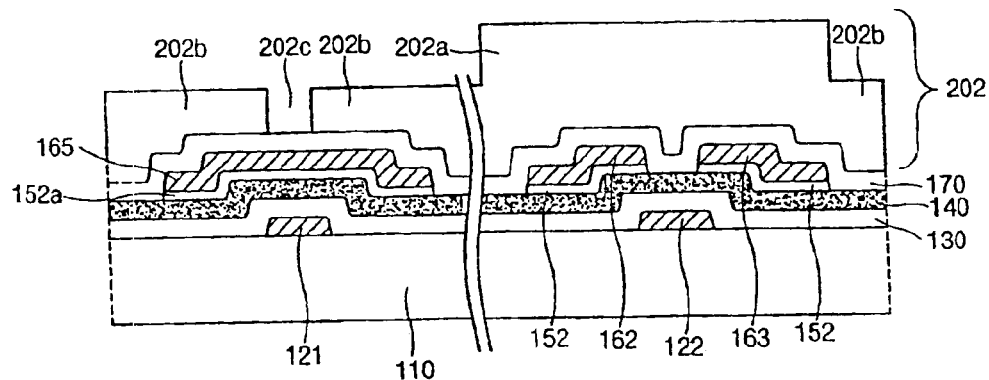
FIGS. 15B and 15C are cross-sectional views taken along the line "XV—XV" of FIG. 15A.
Figure 15C:
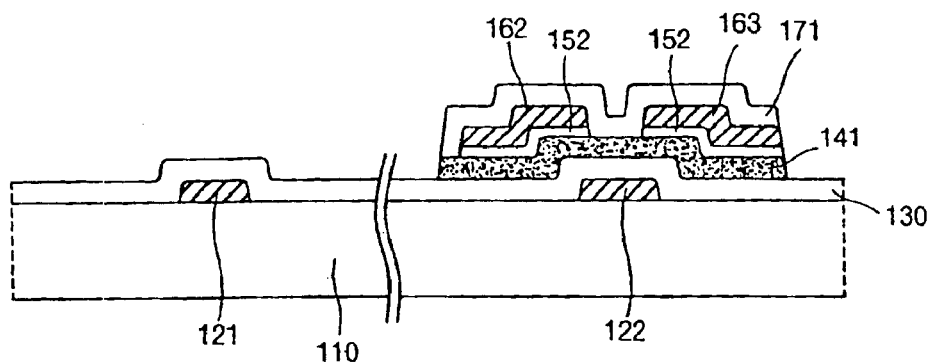

In FIGS. 15A to 15C, a passivation layer 171 is formed to cover the second metal layer including the data line 161. The amorphous silicon layer 170 is patterned to form an active layer 141. At this point, a step-and-repeat exposure process is applied for forming the passivation layer 171 and the active layer 141. During the step-and-repeat exposure process, a first region "G" to a fourth region "J" of the array substrate 110 are sequentially exposed to light. At this point, the boundary lines defining the first to fourth regions "G" to "J" are positioned over the gate line 121 and the data line 161. A more detailed explanation is as follows.

As shown in FIG. 15B, silicon nitride (SiN$_x$) or silicon oxide (SiO$_2$) is deposited to form an insulating layer 170 covering the array substrate 110, and a photoresist 202 is deposited thereon. After the photoresist 202 is exposed to light using the step-and-repeat exposure process, it is subsequently developed and etched such that a first photoresist portion 202a to a third photoresist portion 202c are formed. At this point, the boundary lines defining the first to fourth regions "G" and "J" are preferably designed to be disposed over the gate line 121 and the data line 161 which surround the pixel region "P" but do not serve as a display area of the LCD device.

The first photoresist portion 202a covering the second metal layer including the data line 161 was shielded from rays of light during the exposure. The third photoresist portion 202c covering regions around the boundary line in FIG. 15A was exposed twice to light, whereas the second photoresist portion 202b covering the other regions was exposed to light just once. After the developing and etching, the first photoresist portion 202a has no change in its thickness, but the third photoresist portion 202c is completely removed to be an open hole. The second photoresist portion 202b has a smaller thickness than the first photoresist portion 202a.

After the photoresist 202 is patterned, the first and second photoresist portions 202a and 202b are further etched together with the various layers including the insulating layer 170 and the amorphous silicon layer 140. Thus, the passivation layer 171 and the active layer 141 are formed over the gate electrode 122, and the auxiliary data line 165 and the portion 152a of the doped amorphous silicon layer over the gate line 121 are removed, as shown in FIG. 15C. A dry etching is preferably used for the above-mentioned etching. As previously mentioned, no stitch line is formed during the dry etching after the step-and-repeat exposure process is applied.

Figure 16A:
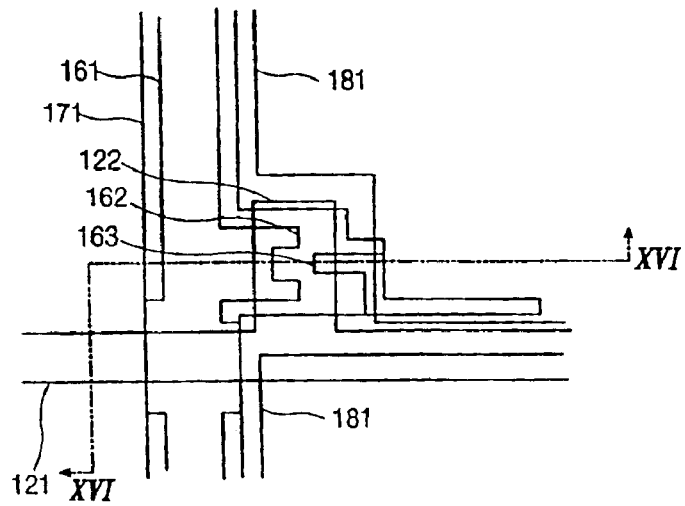
Figure 16B:
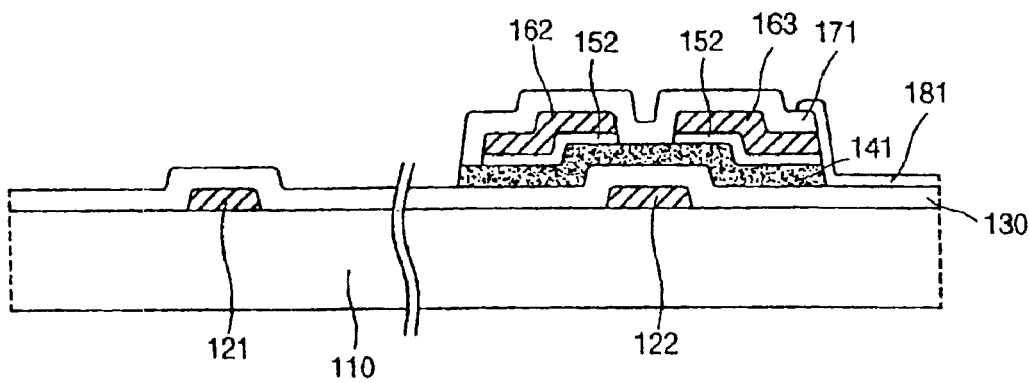

After the passivation layer 171 is formed, a pixel electrode 181 made of a transparent conductive material such as indium tin oxide (ITO) is formed on the array substrate 110, as shown in FIGS. 16A and 16B. The pixel electrode 181 electrically contacts the drain electrode 163.

It will be apparent to those skilled in the art that various modifications and variations can be made in the liquid crystal display device and method of fabricating the same of the present invention without departing from the spirit or scope of the invention. Thus, it is intended that the present invention covers the modifications and variations of this invention provided they come within the scope of the appended claims and their equivalents.

What is claimed is:

1. A liquid crystal display device comprising:

first and second substrates facing into each other;

a gate line on the first substrate;

a gate insulating layer on the first substrate including the gate line;

an active layer on the gate insulating layer;

a data line over the active layer;

a passivation layer on the data line;

a pixel electrode on the gate insulating layer and having a stitch line therein, the stitch line corresponding to a boundary line defined by different exposures during a step-and-repeat process for forming the passivation layer; and a black matrix over the second substrate, wherein the stitch line in the pixel electrode substantially overlaps the black matrix in a vertical direction.

2. A liquid crystal display device comprising:

first and second substrates facing into each other;

a gate line on an inner surface of the first substrate;

a first insulating layer on the gate line;

a silicon layer on the first insulating layer;

a data line on the silicon layer, the data line crossing the gate line;

a second insulating layer on the data line, the second insulating layer having the same shape as the silicon layer;

a pixel electrode at a pixel region defined by the gate and data lines;

a black matrix on an inner surface of the second substrate;

a common electrode on the black matrix; and a liquid crystal layer between the first and second substrates, wherein at least one stitch line is formed in the first insulating layer during a step-and-repeat exposure for forming the second insulating layer, and the black matrix substantially overlaps the stitch line in a vertical direction.

3. The device according to claim 2, wherein the stitch line is disposed over the gate line and the data line.

4. The device according to claim 1, wherein the stitch line is disposed over the gate line and the data line.

5. The device according to claim 1, wherein the gate insulating layer has the stitch line therein.

* * * * *